April 15, 1930.  A. L. CURRIER  1,754,462
VALVE BAG CLOSING AND SEALING TOOL
Filed June 9, 1928
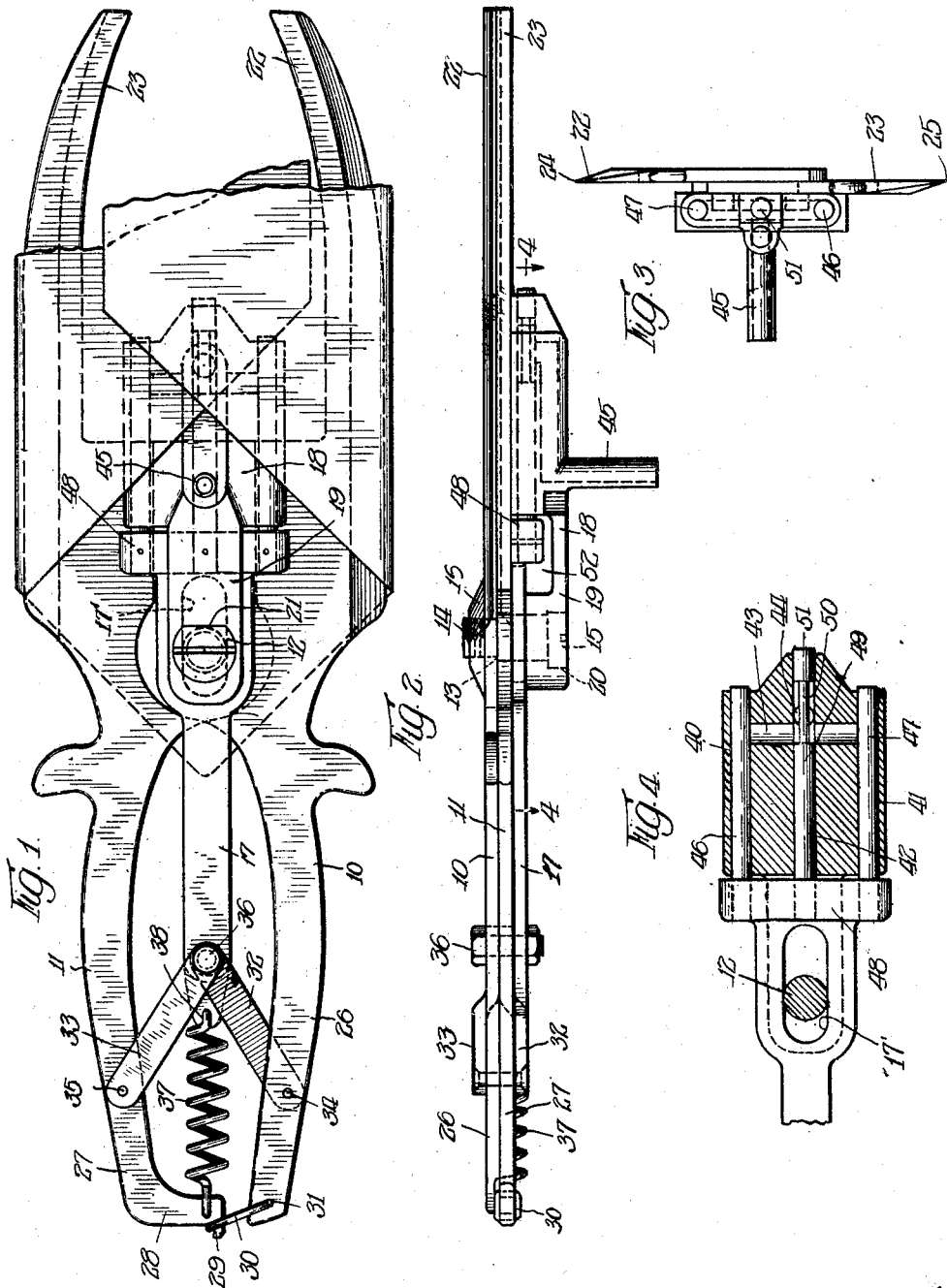
Inventor
Arthur L. Currier
By Wilkinson, Huxley, Byron, & Knight
attys Patented Apr. 15, 1930

1,754,462

UNITED STATES PATENT OFFICE

ARTHUR L. CURRIER, OF ASHBURNHAM, MASSACHUSETTS, ASSIGNOR TO CORNELL MULTI-WALL VALVE BAG COMPANY, OF FITCHBURG, MASSACHUSETTS, A CORPORATION OF DELAWARE

VALVE-BAG CLOSING AND SEALING TOOL

Application filed June 9, 1928. Serial No. 284,235.

This invention relates to a tool and more specifically to a tool for closing, or closing and applying adhesive to, openings such as, for instance, the valve openings in bags.

The principal object of the present invention is to provide a tool which is simple in construction and operation, will efficiently perform the function for which it is intended and will be of such construction and shape that it may be quickly and easily introduced into an opening such as the valve opening of bags for either closing the opening or closing and supplying adhesive between the walls of the opening.

The merits of the present invention will appear from the disclosure of one embodiment thereof which is given merely by way of example, and the utility of the invention will be obvious from the advantages which are realized in the particular embodiment illustrated.

The following description will be more readily understood by referring to the accompanying drawing, in which—

Figure 1 is a plan view of a tool constructed in accordance with this invention located in the valve opening of a bag.

Figure 2 is a side elevation of the device shown in Figure 1, the bag being omitted for clearness.

Figure 3 is an end elevation looking toward the left of the device shown in Figure 1.

Figure 4 is a cross-sectional plan view, taken on the line 4—4 of Figure 2, and looking in the direction of the arrows.

The particular embodiment of the invention herein disclosed is a tool which is constructed for the closing of valve bags, but it is to be understood that it is intended that the application of the present invention be as broad as the principles thereof will permit and that the invention not be in any way limited by the example herein given.

It is conceivable that the invention has application in any operation where a closing or similar operation is to be effected and in which walls to be secured are drawn together in a manner substantially similar to that of closing a valve opening of a bag.

By referring to the drawing, it will be noted that the particular disclosure relates to a manually operable spreading tool comprising a pair of lever elements 10 and 11 pivoted centrally of their length on the bolt or stud 12. The stud is preferably provided with a shoulder 13, a threaded end 14 and a head 15, all in the manner shown in Figure 2, so that the lever element 10 is mounted between the shoulder 13 and the nut 16, whereas the lever 11 is mounted on the enlarged portion of the shank of the bolt. Also mounted on the bolt is the slide rod 17 provided with the elongated slot 17' permitting the rod to slide relative to the bolt, but preventing displacement thereof in the opposite direction. Also carried by the bolt is the cylinder block 18, having the extension 19 provided with a recess 20 adapted to receive the head 15 of the bolt. It will be noted that the recess and the bolt are provided with a flattened portion 21 to prevent relative rotation therebetween. The forward end of the levers constitute inwardly curving blade portions 22 and 23 having outer knife edges 24 and 25. The angle surfaces forming the knife edges are positioned on opposite sides of the two blades so that the opposite knife edges will lie substantially in the same plane. The opposite ends of the levers are fashioned to constitute handles 26 and 27 for operating the tool, each having a lateral protrusion thereon to aid in gripping and to prevent insertion of the tool too far in the valve opening. An extension 28 is provided on the end of the handle 27 having a projection 29 adapted to engage with the locking ring 30 pivotally mounted as at 31 in the end of the handle 26. Links 32 and 33 are pivoted as at 34 and 35 to the handles 26 and 27, respectively, which links are pivoted by means of the bolt 36 to each other and the slide bar 17 in a manner to constitute a toggle link which will impart a reciprocatory movement to the slide bar in response to the movement of the handles. A spring 37 is mounted between the end 38 of the slide bar 17 and the extension 28 on the end of the handle 27. This spring is a tension spring and normally tends to draw the slide bar 17 to the left as shown in the drawing, or, in other words, in a direction to straighten the toggle link for separating the handles 26 and 27 and normally maintaining the blades 22 and 23 of the tool in their maximum inward position. This is the normal relative position of the parts of the tool when it is not in use and when the locking ring 30 is not engaged over the lug 29.

The cylinder block 18, as shown in Figure 4, is provided with three spaced parallel cylinder 40, 41 and 42. The cylinders are connected by a cross channel or duct 43 extending on opposite sides of the cylinder 42 which is in turn in communication with an inlet passage 44 which opens into the middle cylinder 42. The inlet passage 44, it will be noted by referring to Figure 2, terminates in an extension 45, which is of a suitable construction to receive a flexible pipe, tube or other conduit, which is connected to establish a communication between the cylinder 42 and a source of fluid adhesive under pressure.

It is to be understood that the pressure applied to the adhesive is for the purpose of causing it to feed outwardly from the tool when permitted to do so by the operation of the valve and that any pressure, which will accomplish this result, taking into consideration the nature of the adhesive, is sufficient for the purpose of this invention. It is, therefore, conceivable that a chamber of adhesive under pressure may be utilized or that gravity may be utilized by establishing a column of adhesive of sufficient height to cause the feeding thereof.

The cylinders 40 and 41 contain ejecting pistons 46 and 47, which are rigidly connected to the cross-head 48 mounted on the end of the slide bar 17. Located in the central cylinder 42 is the dumb-bell valve piston 49 also rigidly attached to the cross-head 48. The dumb-bell piston, it will be noted, has a portion 50 of less diameter than the cylinder in which it operates and a portion 51 at its end for closing the end of the cylinder.

The extension 19 which is provided for mounting the cylinder block on the bolt is of such construction that the opening or space 52 is provided, in which space the cross-head 48 may reciprocate without interference of the parts.

As shown in Figure 2, the toggle links 32 and 33 above referred to, are preferably bent in a manner to bring their ends in the proper planes to be pivotally attached to the handles of the levers and to the sliding bar 17, respectively.

In operation, although the device is capable of various uses, it is recognized that it is particularly adapted for closing the valve of valve bags. Valve bags are usually employed for packaging powdered, granular or other finely divided substances, such as, for instance, cement, lime, sugar, or similar materials. The filling operation is usually accomplished by the introduction of a spout or outlet nozzle into the valve opening of a bag, which after removal of the filled bags leaves the opening in a stretched, circular, open condition. At this point the present tool is introduced into the valve opening, and operated to bring the opposite walls of the opening toward and into engagement with each other and to deposit between said walls an amount of adhesive sufficient for securing the walls together.

The tool when manually operated will be carried in the hand of the operator who is positioned to receive the bags as they are removed from the filling machine. The tool is supplied with a flexible connection of sufficient length to permit freedom of movement of the tool bodily by the operator and yet maintain at all times a connection between the tool and a supply of fluid adhesive under sufficient pressure to cause it to feed in operation. During the operation the locking ring 30 is removed from the lug 29 and under the action of the spring 37 the handles are normally spread with the operating blades in their maximum approached position. With the tool in this condition it can be readily thrust into the opening of the bag until it has been introduced an amount sufficient to locate the ends of the cylinders 40 and 41 at approximately the position where it is desirable to deposit adhesive. When so located the handles are squeezed together, thereby forcing the blades 22 and 23 apart with such force that the valve opening is spread laterally in a manner to cause the upper and lower walls thereof to approach each other and come into such relationship that they are in contact, or so nearly in contact that they may be caused to contact by the application of the slightest external pressure. The spreading blades 22 and 23 are quite thin so that they offer substantially no resistance to the walls coming into contacting relationship.

By the approaching movement of the handles in the operation above described through the instrumentality of the links 22 and 23, the slide bar 17 is thrust forward, sliding on the pivot by means of the slot 17' and causing the ejection of a charge of adhesive which has been previously located in the cylinders 40 and 41 by an operation hereinafter described. The charge of adhesive which is ejected during a particular operation of the tool is introduced into the cylinders 40 and 41 during the removal and release of the tool from the previous operation. This will be obvious when it is understood that the operator permits the handles to spread under the influence of the spring 37 when it has been removed from the valve opening and during the spreading of the handles that the slide-bar 17 is drawn to the left in a manner to move the pistons 40, 41 and 42 inwardly.

During this operation, bearing in mind that the inlet passage 44 contains adhesive under pressure, it will be obvious that due to the relationship of the cylinders and duct, and construction of the several pistons that the ends of the pistons 46 and 47 will pass the duct 43 in a manner to establish a communication through the duct and out through the end of the cylinders slightly prior to the closing off of the inlet passage 44 by the valve piston portion 51. During this small interval the pressure on the adhesive is such that a predetermined charge of adhesive is caused to pass into the cylinders 40 and 41, where it remains until the tool is used in closing the next bag. Upon drawing the handles together in the next operation, a similar but opposite valve action is effected in which a slight additional charge of adhesive is introduced into the cylinders 40 and 41. On the continued movement of the pistons 46 and 47 the duct 43 is cut off and the adhesive trapped in the ends of the cylinders 40 and 41 is ejected therefrom. The two dobbs so deposited may be spread and serve to secure the opposite walls of the bag valve.

Attention is directed to the fact that the pistons 46 and 47 are slightly longer than the cylinders in which they are positioned so that when the tool is not in use, as when locked by the ring 30, as shown in Figure 1, the pistons occupy the entire cylinders thereby preventing the drying of adhesive therein and consequent clogging of the openings and also preventing exposure of the interior of the valve block to the atmosphere for the same purpose.

It is to be understood that although the present invention is shown as applied to a manually operable tool, that it could be connected for operation as a part of a machine to function in substantially the same manner.

The above disclosure is given merely as one embodiment of the present invention, and is not to be considered as limiting the invention in any way. It is obvious that various structures may be employed as equivalent for effecting the operation of the tool herein disclosed. The scope of the invention will be determined by an understanding of the present disclosure as one embodiment thereof and will be particularly pointed out in the appended claims.

I claim:

1. A device for closing openings of bags comprising means for entering a bag opening, said means having relatively movable elements contacting portions of the wall of said opening, said means being constructed to move said elements in a manner to cause opposite walls of said openings to approach each other, and means for depositing adhesive between said approaching walls.

2. A device for closing openings of bags comprising means for entering a bag opening, said means having relatively movable elements, contacting portions of the wall of said opening, said means being constructed to move said elements in a manner to cause opposite walls of said opening to approach each other, and means for depositing substantially a predetermined amount of adhesive between said approaching walls.

3. A tool comprising means for entering the opening of a bag for causing opposite walls of said opening to approach each other, and adhesive depositing means located in a position to deposit adhesive between said approaching walls, said first named means and adhesive depositing means being connected for combined operation.

4. A tool comprising a pair of spreading elements, handles therefor, valve and piston cylinders mounted adjacent said pair of spreading elements, a valve and piston, respectively, in said cylinders, a source of adhesive connected to said cylinders, and means connecting said valve and piston to said handles, whereby adhesive is ejected when said elements are spread.

5. A tool comprising a pair of spreading elements, handles therefor, an adhesive ejecting device mounted adjacent said spreading elements and means connecting said adhesive device to said handles whereby adhesive is ejected when said elements spread.

Signed at Fitchburg, Mass., this 5th day of June, 1928.

ARTHUR L. CURRIER.